United States Patent [19]

Kim

[11] Patent Number: 5,691,769
[45] Date of Patent: Nov. 25, 1997

[54] APPARATUS FOR ENCODING A CONTOUR OF AN OBJECT

[75] Inventor: Jin-Hun Kim, Seoul, Rep. of Korea

[73] Assignee: Daewoo Electronics Co, Ltd., Seoul, Rep. of Korea

[21] Appl. No.: 524,708

[22] Filed: Sep. 7, 1995

[51] Int. Cl.$^6$ .................................................. H04N 7/24
[52] U.S. Cl. ........................ 348/403; 382/241; 382/242
[58] Field of Search ................................ 382/241, 242, 382/243, 238, 236, 232; 348/416, 415, 409, 402, 401, 400, 403, 390, 384; H04N 7/133

[56] References Cited

U.S. PATENT DOCUMENTS

| 5,295,201 | 3/1994 | Yokohama | 348/416 |
| 5,546,129 | 8/1996 | Lee | 348/416 |

*Primary Examiner*—Tommy P. Chin
*Assistant Examiner*—Bryan S. Tung
*Attorney, Agent, or Firm*—Anderson Kill & Olick P.C.

[57] ABSTRACT

A contour encoding apparatus determines vertex points on the previous contour of the previous frame based on a polygonal approximation. A set of first approximation errors is calculated at a predetermined number of sample points on each first line segment between two vertex points, and a first set of discrete sine transform coefficients is obtained by discrete sine transforming the set of first approximation errors for each first line segment. Predicted vertex points are detected based on the vertex information and current contour of the current frame. A set of second approximation errors is calculated at the predetermined number of sample points on each second line segment between two predicted vertex points, and a second set of discrete sine transform coefficients is obtained by discrete sine transforming the set of second approximation errors for each second line segment. After determining a set of differences by subtracting the second set of discrete sine transform coefficients from the corresponding first set of discrete sine transform coefficients, the set of differences are encoded for transmission to thereby reduce the volume of transmission data.

2 Claims, 3 Drawing Sheets

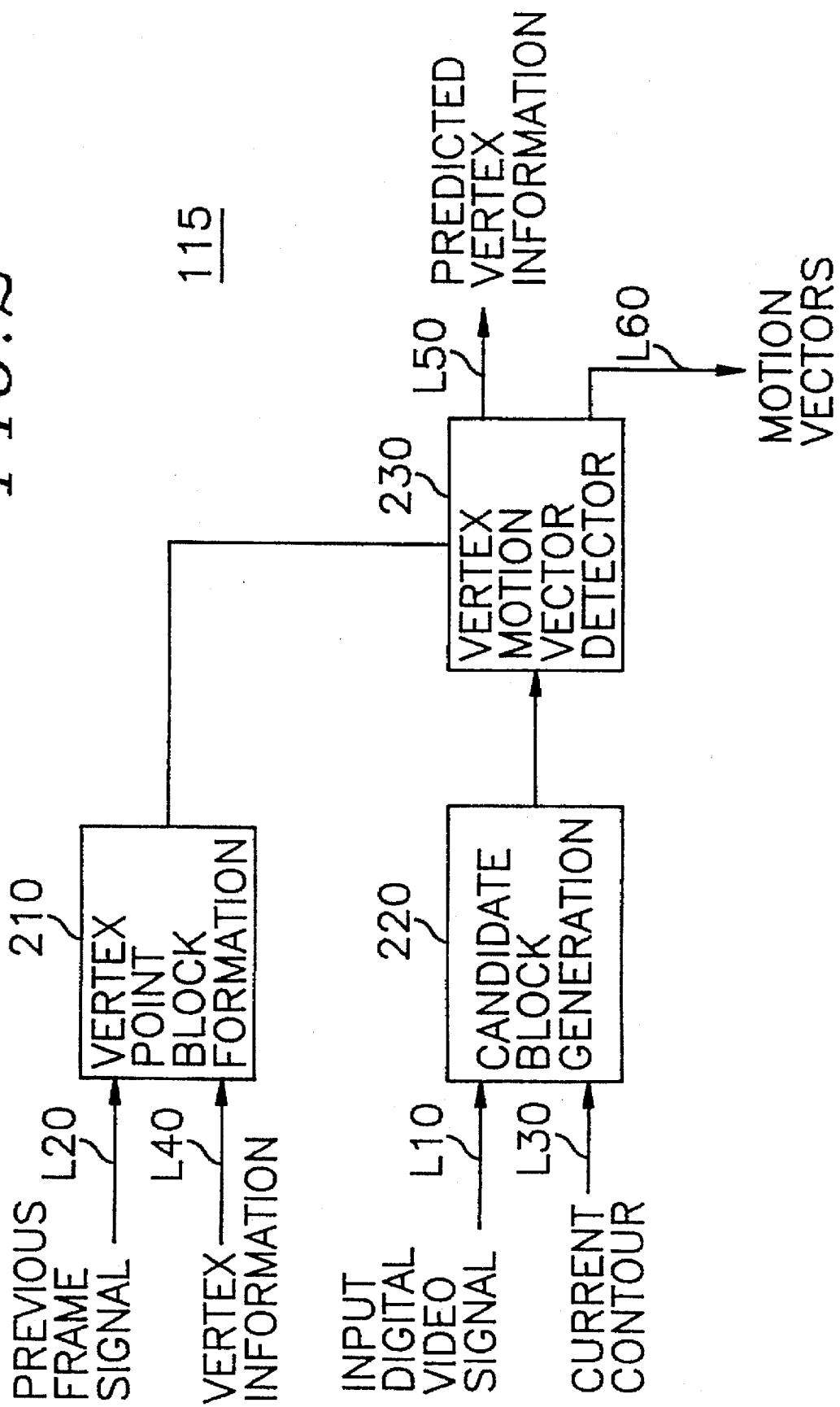

FIG. 3A
FIG. 3B
FIG. 3C
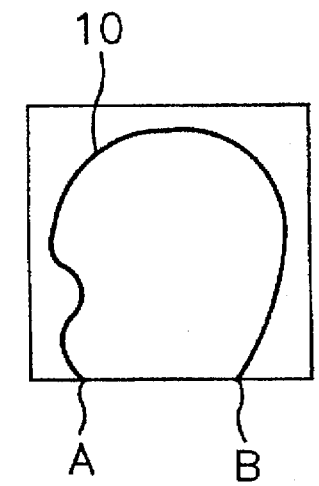
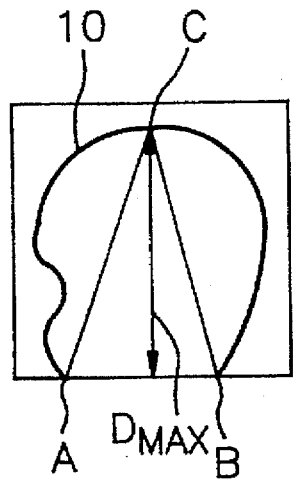
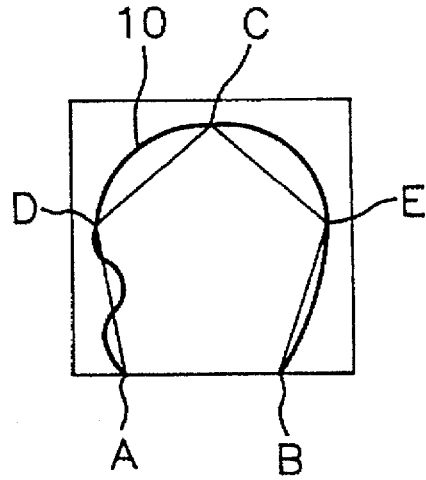
FIG. 4A
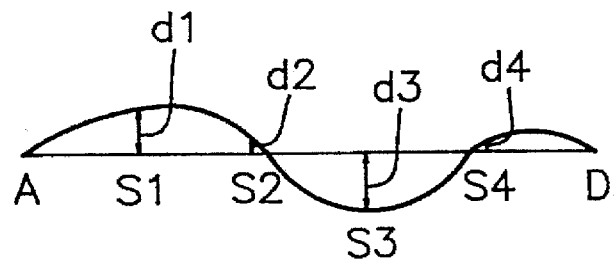
FIG. 4B
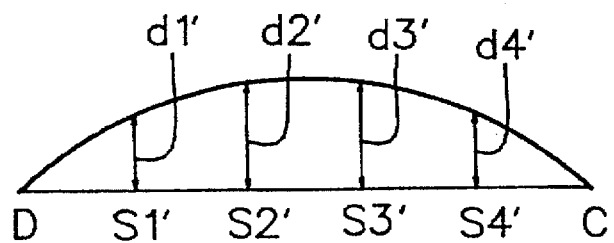

APPARATUS FOR ENCODING A CONTOUR OF AN OBJECT

FIELD OF THE INVENTION

The present invention relates to an apparatus for encoding a contour of an object; and, more particularly, to a contour encoding apparatus which is capable of reducing the amount of data to be transmitted by using a vertex point motion estimation.

DESCRIPTION OF THE PRIOR ART

In digital television systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the substantial amount of digital data therethrough, it is inevitable to compress or reduce the volume of data through the use of various data compression techniques, especially, in the case of such low bit-rate video signal encoders as video-telephone and teleconference system.

One of such methods for encoding video signals for a low bit-rate encoding system is the so-called object-oriented analysis-synthesis coding technique(see Michael Hötter, "Object-Oriented Analysis-Synthesis Coding Based on Moving Two-Dimensional Objects", *Signal Processing: Image Communication* 2, 409–428(December, 1990)).

According to the object-oriented analysis-synthesis coding technique, an input video image is divided into objects; and three sets of parameters for defining the motion, contour and pixel data of each object are processed through different encoding channels.

Specifically, in processing a contour of an object, the contour information is important for the analysis and synthesis of the object shape. A classical coding method for representing the contour information is chain coding. The chain coding method, however, requires a substantial amount of bits for the representation thereof, although there is no loss in the contour information.

In this regard, there have been proposed several methods to approximate a contour of an object such as polygonal approximation and B-spline approximation. One of the disadvantages in the polygonal approximation is the rough representation of the contour of an object. The B-spline approximation is, on the other hand, capable of representing the contour more precisely; however, it requires a high-order polynomial to reduce the approximation error, thereby increasing the overall computational complexity of the video encoder.

One of the techniques introduced to ameliorate the problems associated with the rough representation of the contour of an object and the computational complexity from the polygonal and B-spline approximation approaches is a contour approximation method employing a discrete sine transform(DST).

In an apparatus which adopts the contour approximation technique based on the polygonal approximation and the DST, as disclosed in a commonly owned copending application, U.S. Ser. No. 08/423,604, entitled "A CONTOUR APPROXIMATION APPARATUS FOR REPRESENTING A CONTOUR OF AN OBJECT", a number of vertex points are determined and the contour of an object is approximated through the use of polygonal approximation for fitting the contour by line segments. And, N sample points for each line segment are selected and an approximation error at each of the N sample points located on each line segment is sequentially calculated in order to obtain a set of approximation errors for each line segment. The N sample points are equi-spaced on each line segment and each of the approximation errors represents the distance between each of the N sample points and the contour. Thereafter, sets of DST coefficients are generated by performing one-dimensional DST operation on each set of approximation errors.

Even though it is possible to remedy the rough representation and computational complexity through the use of the aforementioned DST based contour approximation, it results in an increased volume of transmission data since the DST coefficients for every frame must be transmitted.

SUMMARY OF THE INVENTION

It is, therefore, a primary object of the invention to provide an improved apparatus for encoding a contour of an object, which is capable of reducing the amount of transmission data through the use of a vertex point motion estimation technique.

In accordance with the invention, there is provided an apparatus for encoding a contour of an object expressed in a digital video signal, the digital video signal having a plurality of frames including a current frame and a previous frame, which comprises: a first contour detector for detecting a boundary of the object within the previous frame to generate a previous contour, wherein the previous contour provides previous boundary information for tracing the boundary of the object in the previous frame; a polygonal approximation section for determining a number of vertex points on the previous contour, and for providing a polygonal approximation of the previous contour by fitting the previous contour with a plurality of first line segments, to thereby generate vertex information representing the positions of the vertex points on the previous contour, each of the first line segments joining two neighboring vertex points; a first sampling and error detector for providing N sample points for each of the first line segments and calculating an error for each of the N sample points on each of the first line segments to produce a first set of errors for each of the first line segments, wherein said N sample points are equi-spaced on each of the first line segments and each of the first set of errors represents the distance between said each of the N sample points and the previous contour; a first transform circuit for transforming the first set of errors for each of the first line segments into a first set of discrete sine transform coefficients; a second contour detector for detecting a boundary of the object within the current frame to generate a current contour, wherein the current contour provides current boundary information for tracing the boundary of the object in the current frame; a vertex prediction block for detecting predicted vertex points based on an estimation of motion between the current and the previous frames through the use of the vertex information and the current boundary information from the current contour, to thereby provide predicted vertex information and motion vectors, the predicted vertex information representing the positions of the predicted vertex points and each of the motion vectors representing a displacement between a vertex point and its corresponding predicted vertex point; a second sampling and error detector for providing N sample points for each of second line segments joining two predicted vertex points and calculating an error for each of the N sample points on each of the second line segments to produce a second set of errors for each of the second line segments, wherein said N sample points are equi-spaced on each of the second line segments and each of the second set of errors represents the distance between said each of the N sample points and the current contour; a second transform circuit for transforming the second set of errors for each of the second line segments into a second set of discrete sine transform coefficients; a subtractor for generating a set of differences by subtracting the second set of discrete sine transform coefficients from the first set of discrete sine transform coefficients corresponding thereto; a quantizer for converting the set of differences into a set of quantized differences; and a contour coder for encoding the set of quantized differences and the motion vectors.

BRIEF DESCRIPTION OF THE DRAWINGS

The above and other objects and features of the present invention will become apparent from the following description of preferred embodiments given in conjunction with the accompanying drawings, in which:

FIG. 2 presents a detailed block diagram of the vertex prediction block shown in FIG. 1;

FIGS. 3A to 3C illustrate an exemplary polygonal approximation process of the contour of an object; and FIGS. 4A and 4B show exemplary diagrams, each representing errors between a line segment joining two vertex points and its corresponding contour segment.

DETAILED DESCRIPTION OF THE PREFERRED EMBODIMENTS

Figure 1:
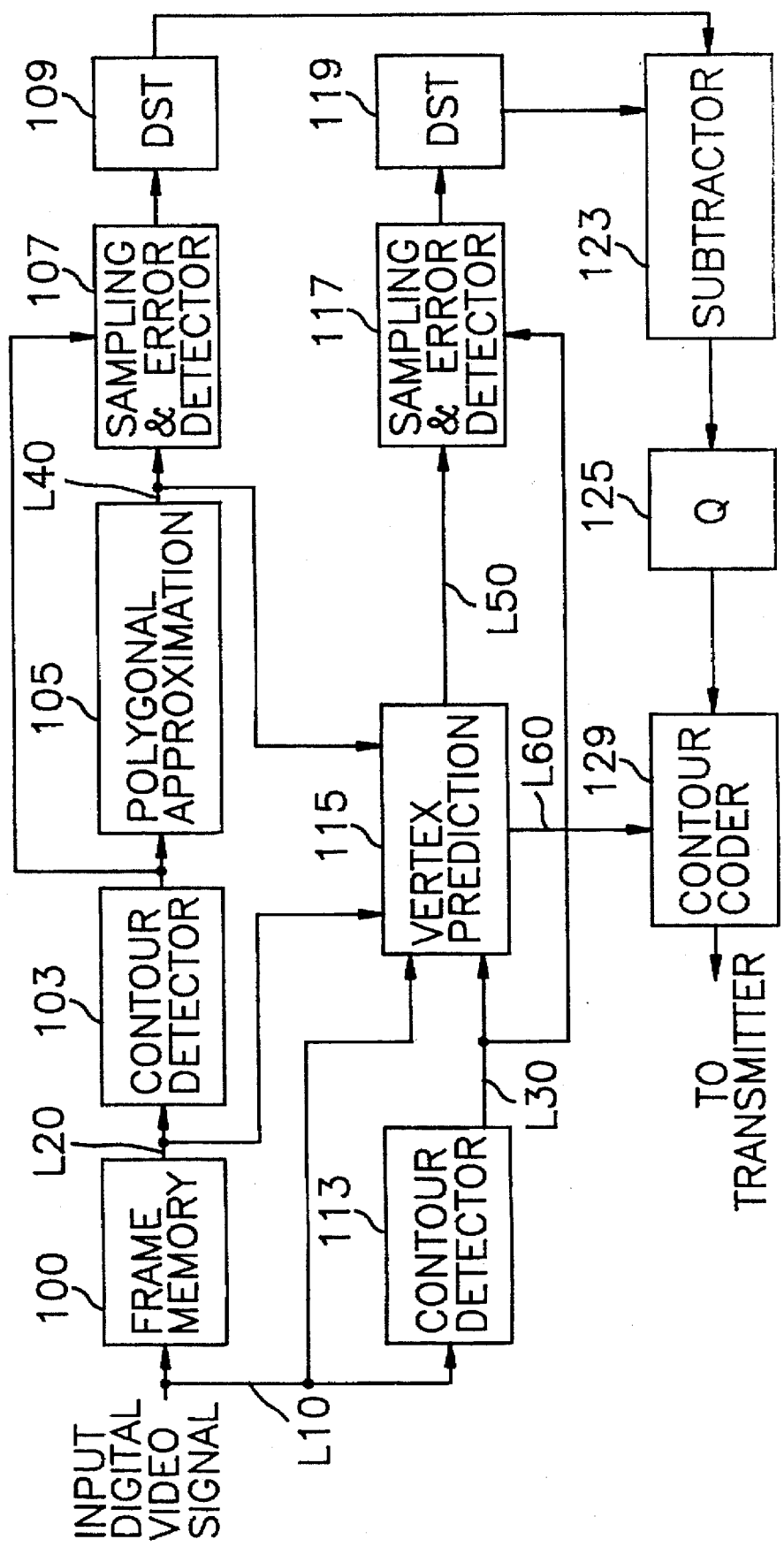
FIG. 1 depicts a block diagram of an apparatus for encoding a contour of an object in accordance with the present invention.

Referring to FIG. 1, there is shown a block diagram of the inventive apparatus for encoding a contour of an object expressed in a video signal. An input digital video signal is fed, as a current frame signal, to a second contour detector 113 and a vertex prediction block 115 through a line L10; and is stored as a previous frame signal in a frame memory 100 which is connected to a first contour detector 103 and the vertex prediction block 115 through a line L20.

The first contour detector 103 detects a boundary or contour of an object in the previous frame retrieved from the frame memory 100 and generates a previous contour, wherein the previous contour provides previous boundary information for tracing the boundary of the object in the previous frame, said previous boundary information including position data of the pixels along the boundary of the object in the previous frame. The contour data representing the contour of the object is provided from the first contour detector 103 to a polygonal approximation section 105 and a first sampling and error detector 107.

At the polygonal approximation section 105, the previous contour is approximated by a polygonal approximation technique. The polygonal approximation of the object shape is achieved through the use of a conventional approximation algorithm for fitting the contour with a plurality of line segments.

Referring to FIGS. 3A to 3C, there is illustrated a segmentation process for an exemplary previous contour 10 according to the polygonal approximation technique.

First, two starting vertex points are selected. If the previous contour is of an open loop, two end points, e.g., A and B as shown in FIG. 3A, are selected as the starting vertex points. On the other hand, if the previous contour is in the form of a closed loop, two farthest points on the contour are selected as the starting vertex points. And then, the farthest point on the contour from a line segment AB is determined. If the distance $D_{max}$ between the farthest point, e.g., C, and the line segment AB is greater than a predetermined threshold value, the point C becomes a vertex point. This procedure is repeated until said $D_{max}$ for each segment becomes smaller than the predetermined threshold value.

The number of vertex points depends on the predetermined threshold value. As can be seen from FIGS. 3A to 3C, the representation of the contour by line segments becomes more accurate with a smaller predetermined threshold value at the expense of coding efficiency.

Referring back to FIG. 1, vertex information representing the positions of the determined vertex points, e.g., A, B, C, D and E, of the previous contour 10 is provided from the polygonal approximation section 105 to the first sampling and error detector 107 and the vertex prediction block 115 through a line L40. The first sampling and error detector 107 selects N sample points for each line segment and calculates an approximation error at each of the N sample points on each line segment based on the vertex information and the previous contour data; provides the approximation errors to a first discrete sign transform(DST) circuit 109, wherein the N sample points are equi-spaced on each line segment between two vertex points with N being an integer. The approximation errors represent the distances between a line segment joining two vertex points and the contour segment between the two vertex points.

FIGS. 4A and 4B illustrate exemplary diagrams representing approximation errors between line segments and corresponding contour segments, wherein FIG. 4A depicts approximation errors between the line segment AD and its corresponding contour segment and FIG. 4B shows approximation errors between the line segment DC and its corresponding contour segment. Each of the errors d1 to d4 or d1' to d4' represents the distance from each sample point S1 to S4 on the line segment AD or S1' to S4' on the line segment DC to the corresponding contour segment. As can be seen in FIGS. 4A and 4B, the approximation errors for the vertex points are all "zeros". For all the vertex points are positioned on the contour.

The approximation errors calculated by the first sampling and error detector 107 are supplied to the first DST circuit 109. The first DST circuit 109 performs one-dimensional DST operation on each set of approximation errors and generates a first set of DST coefficients to a subtractor 123, said approximation errors for each set including errors for N sample points and two vertex points of each line segment.

In the meantime, the second contour detector 113 performs the same function as the first contour detector 103, to thereby generate a current contour to the vertex prediction block 115 and a second sampling and error detector 117 via a line L30. That is, the second contour detector 113 detects a boundary of an object in the input digital video signal supplied thereto as the current frame signal and generates or defines the current contour, wherein the current contour provides current boundary information for tracing the boundary of the object in the current frame, said current boundary information including position data of the pixels along the boundary of the object in the current frame.

At the vertex prediction block 115, the input digital video signal, i.e., the current frame signal, on the line L10, the previous frame signal on the line L20 retrieved from the frame memory 100, the current contour data on the line L30 from the second contour detectors 113 and the vertex points represented by the vertex information on the L40 from the polygonal approximation section 105 are processed to generate predicted vertex information onto a line L50 and motion vectors for the vertex points onto a line L60, wherein the predicted vertex information represents the positions of the predicted vertex points and the motion vectors represent the displacements between the vertex points and the predicted vertex points. Details of the vertex prediction block 115 will be described with reference to FIG. 2.

After detecting the motion vectors for all of the vertex points, the predicted vertex points and the motion vectors are provided to a contour coder 129 and the second sampling and error detector 117 through lines L50 and L60, respectively. The second sampling and error detector 117 performs the same function as the first sampling and error detector 107 based on the predicted vertex information representing the positions of the predicted vertex points and the current contour data on the line L30 from the second contour detector 113, thereby providing a second DST circuit 119 with sets of predicted approximation errors. That is, the second sampling and error detector 117 selects N sample points for each line segment joining two predicted vertex points and calculates a predicted approximation error at each of the N sample points on each line segment based on the predicted vertex information and the current contour data; provides the predicted approximation errors to the second DST circuit 119, wherein the N sample points are equi-spaced on each line segment between two predicted vertex points. The predicted approximation errors represent the distances between a line segment joining two predicted vertex points and the current contour segment between the two predicted vertex points. The second DST circuit 119 performs the same function as the first DST circuit 109, thereby generating a second set of DST coefficients to the subtractor 123.

The subtractor 123 subtracts the second set of DST coefficients from the corresponding first set of DST coefficients and provides a set of differences therebetween to a quantizer 125. The quantizer 125 quantizes the set of differences to provide a set of quantized differences to the contour coder 129 for further processing.

At the contour coder 129, the set of quantized differences is encoded together with the motion vectors on the line L60 from the vertex prediction block 115, e.g., by using the binary arithmetic code of JPEG(Joint Photographic Experts Group). The encoded digital signal comprising the encoded quantized differences and the motion vectors is transmitted to a transmitter(not shown) for the transmission thereof.

Referring now to FIG. 2, there is illustrated a detailed block diagram of a vertex prediction block 115, shown in FIG. 1, for explaining a vertex point prediction process.

In a preferred embodiment of the present invention, the motion vectors for the vertex points are detected, wherein each of the motion vectors represents a spatial displacement between a vertex point in the previous frame and a most similar pixel thereto in the current frame called a predicted vertex point. To detect a motion vector between a vertex point and a predicted vertex point, there is used a block matching algorithm.

As shown in FIG. 2, the vertex information is provided via the line L40 from the polygonal approximation section 105 to a vertex block formation section 210. At the vertex block formation section 210, a vertex point block having each of the vertex points at the center thereof, e.g., 5 ×5 pixels of the previous frame, is retrieved via the line L20 from the frame memory 100 and provided to a vertex motion vector detector 230.

In the meanwhile, the input digital video signal on the line L10 is fed as the current frame signal to a candidate block generation section 220 and the current contour on the line L30 is also fed to the candidate block generation section 220. The candidate block generation section 220 defines a generally larger search region of the current frame and generates a plurality of equal-sized candidate blocks to the vertex motion vector detector 230.

In the preferred embodiment of the present invention, the search region defined in the current frame includes a predetermined number of pixels in the neighborhood of the current contour, and the plurality of candidate blocks are chosen such that their center pixels are those pixels forming a part of the current contour, thereby placing the predicted vertex points on the current contour.

At the vertex motion vector detector 230, the motion vector for each of the vertex point blocks from the vertex point block formation section 210 is determined after a similarity calculation between the vertex point block and each of the plurality of candidate blocks included in the search region from the candidate block generation section 220. The determined motion vector for the vertex point block is assigned as the motion vector of the vertex point contained in that vertex point block. Thereafter, the motion vectors for the vertex points and the predicted vertex information are generated onto the lines L60 and L50, respectively.

As demonstrated above, therefore, the present invention is capable of substantially reducing the volume of transmission data for representing the contour of an object expressed in video signals by transmitting the set of differences between the first and the second sets of DST coefficients.

While the present invention has been described with respect to the particular embodiments, it will be apparent to those skilled in the art that various changes and modifications may be made without departing from the spirit and scope of the invention as defined in the following claims.

What is claimed is:

1. An apparatus for encoding a contour of an object expressed in a digital video signal, said digital video signal having a plurality of frames including a current frame and a previous frame, which comprises:

a first contour detecting means for detecting a boundary of the object within the previous frame to generate a previous contour, wherein the previous contour provides previous boundary information for tracing the boundary of the object in the previous frame;

means for determining a number of vertex points on the previous contour;

means for providing a polygonal approximation of the previous contour by fitting the previous contour with a plurality of first line segments, to thereby generate vertex information representing the positions of the vertex points of the previous contour, each of the first line segments joining two neighboring vertex points;

first means for providing N sample points for each of the first line segments and calculating an error for each of the N sample points on each of the first line segments to produce a first set of errors for each of the first line segments, wherein said N sample points are equi-spaced on each of the first line segments and each of the first set of errors represents the distance between said each of the N sample points and the previous contour;

first transform means for transforming the first set of errors for each of the first line segments into a first set of discrete sine transform coefficients;

second contour detecting means for detecting a boundary of the object within the current frame to generate a current contour, wherein the current contour provides current boundary information for tracing the boundary of the object in the current frame;

means for detecting predicted vertex points based on an estimation of motion between the current and the previous frames through the use of the vertex information and the current boundary information from the current contour, to thereby provide predicted vertex information and motion vectors, the predicted vertex information representing the positions of the predicted vertex points and each of the motion vectors representing a displacement between a vertex point and its corresponding predicted vertex point;

second means for providing N sample points for each of second line segments joining two predicted vertex points and calculating an error for each of the N sample points on each of the second line segments to produce a second set of errors for each of the second line segments, wherein said N sample points are equi-spaced on each of the second line segments and each of the errors of the second set represents the distance between said each of the N sample points and the current contour;

second transform means for transforming the second set of errors for each of the second line segments into a second set of discrete sine transform coefficients;

means for generating a set of differences by subtracting the second set of discrete sine transform coefficients from the first set of discrete sine transform coefficients corresponding thereto;

means for converting the set of differences into a set of quantized differences; and means for encoding the set of quantized differences and the motion vectors.

2. The apparatus according to claim 1, wherein said predicted vertex points detecting means includes:

means for generating vertex point blocks from the previous frame based on the vertex information, each of the vertex point blocks having a vertex point at the center thereof;

means for defining a search region of the current frame and generating a plurality of equal-sized candidate blocks from the search region, each of the candidate blocks is chosen such that its center pixel is a pixel forming a part of the current contour; and means for detecting the predicted vertex points by performing a block matching algorithm between the vertex point block and each of the plurality of candidate blocks to generate the predicted vertex information representing the positions of the predicted vertex points and the motion vectors representing the displacements between the vertex points and the predicted vertex points.

* * * * *